United States Patent
Kataoka

(10) Patent No.: US 12,418,257 B2
(45) Date of Patent: Sep. 16, 2025

(54) POWER CONVERSION DEVICE AND MOTOR MODULE

(71) Applicant: NIDEC CORPORATION, Kyoto (JP)

(72) Inventor: Kotaro Kataoka, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 121 days.

(21) Appl. No.: 18/279,200

(22) PCT Filed: Jun. 11, 2021

(86) PCT No.: PCT/JP2021/022346
§ 371 (c)(1),
(2) Date: Aug. 28, 2023

(87) PCT Pub. No.: WO2022/208911
PCT Pub. Date: Oct. 6, 2022

(65) Prior Publication Data
US 2024/0154560 A1    May 9, 2024

(30) Foreign Application Priority Data
Mar. 30, 2021 (JP) ................. 2021-056614

(51) Int. Cl.
*H02P 6/14* (2016.01)
*H02P 23/04* (2006.01)
(Continued)

(52) U.S. Cl.
CPC ............. *H02P 27/08* (2013.01); *H02P 23/04* (2013.01); *H02P 25/03* (2016.02)

(58) Field of Classification Search
CPC .......... H02P 27/08; H02P 25/03; H02P 23/04; H02P 27/085; H02P 27/06; H02P 6/28
See application file for complete search history.

(56) References Cited

U.S. PATENT DOCUMENTS 10,411,615 B2   9/2019  Mori et al.
2007/0216338 A1*  9/2007  Yoshimoto .............. H02M 1/10
                                                          318/800

FOREIGN PATENT DOCUMENTS

EP         4092901 A1 * 11/2022  ............. G01R 31/40
JP         H09308252       11/1997
(Continued)

OTHER PUBLICATIONS

"International Search Report (Form PCT/ISA/210) of PCT/JP2021/022346", mailed on Jul. 27, 2021, with English translation thereof, pp. 1-4.

*Primary Examiner* — Karen Masih
(74) *Attorney, Agent, or Firm* — JCIPRNET

(57) ABSTRACT

A power conversion device converts DC power into n-phase AC power. A first voltage and a second voltage lower than the first voltage are applied to the power conversion device, and the power conversion device outputs an n-phase output voltage based on a modulation factor. n is the number of phases of the AC output, and is an odd number of 3 or more. At a low modulation factor equal to or less than a first modulation factor, the output voltage becomes a sinusoidal output. At the second modulation factor larger than the first modulation factor, the output voltage is switched every electrical angle $\pi/n$ between the phase in which the output voltage is fixed to the maximum voltage and the phase in which the output voltage is fixed to the minimum voltage.

13 Claims, 14 Drawing Sheets

(51) Int. Cl.
*H02P 25/03* (2016.01)
*H02P 27/08* (2006.01)

(56) References Cited

FOREIGN PATENT DOCUMENTS

| | | |
|---|---|---|
| JP | 2005045846 | 2/2005 |
| JP | 2019047713 | 3/2019 |
| WO | 2017168522 | 10/2017 |

* cited by examiner

MODULATION FACTOR 0.8 (SINE WAVE)

MODULATION FACTOR $\sqrt{3}/2$ (MAXIMUM AMPLITUDE IN SINE WAVE)

THIRD-ORDER HARMONIC SUPERIMPOSITION

PRESENT INVENTION

POWER CONVERSION DEVICE AND MOTOR MODULE

CROSS-REFERENCE TO RELATED APPLICATION

This application is a 371 application of the international PCT application serial no. PCT/JP2021/022346, filed on Jun. 11, 2021, which claims the priority benefits of Japan application no. 2021-056614, filed on Mar. 30, 2021. The entirety of each of the above-mentioned patent applications is hereby incorporated by reference herein and made a part of this specification.

FIELD OF THE INVENTION

The present invention relates to a power conversion device and a motor module.

BACKGROUND

Conventionally, a power conversion device includes a power conversion unit and a control unit. The control unit includes an intermediate value generation unit, a superimposition amount generation unit, a voltage value command value calculation unit, and a PWM control means.

The intermediate value generation unit sequentially compares the magnitudes of the AC output voltage command values of the three-phase power converter and generates an intermediate value. The superimposition amount generation unit outputs a superimposition amount that is a value changing in accordance with the amplitude value of the three-phase AC voltage command value. The voltage value command value calculation unit creates a new three-phase AC voltage command value by adding to the three-phase AC voltage command value. The PWM control means compares the voltage command value with a carrier wave and outputs a PWM signal.

However, in the power conversion device, the amplitude of a neutral point potential increases and a harmonic component increases near the maximum modulation factor (e.g., the modulation factor is $2/\sqrt{3}$). The neutral point potential is an average waveform of three phases. Furthermore, since the output voltage waveform of each phase includes a non-differentiable point that is not smooth, it includes many high-order harmonics.

Therefore, it can be a cause of noise. When a motor is driven by the power conversion device, it may become a cause of torque unevenness.

SUMMARY

One aspect of an exemplary power conversion device of the present invention converts DC power into n-phase AC power. A first voltage and a second voltage lower than the first voltage are applied to the power conversion device, and the power conversion device outputs an n-phase output voltage based on a modulation factor. n is the number of phases of the AC output, and is an odd number of 3 or more. At a low modulation factor that is equal to or less than a first modulation factor, the output voltage becomes a sinusoidal output. At a second modulation factor larger than the first modulation factor, the output voltage is switched every electrical angle $\pi/n$ between a phase in which the output voltage is fixed to a maximum voltage and a phase in which the output voltage is fixed to a minimum voltage.

One aspect of an exemplary power conversion device of the present invention converts DC power into n-phase AC power. The power conversion device outputs an n-phase output voltage based on the modulation factor. n is the number of phases of the AC output, and is an odd number of 3 or more. The waveform of the output voltage of each phase is a waveform obtained by subtracting a common offset wave from a sinusoidal waveform. The waveform of the offset wave matches a product of a maximum waveform and a minimum waveform of the sinusoidal waveform moved and connected in an amplitude value direction and multiplied by a coefficient. The maximum waveform indicates a maximum waveform of the sinusoidal waveforms of all the phases. The minimum waveform indicates a minimum waveform of the sinusoidal waveforms of all the phases.

One aspect of an exemplary motor module of the present invention includes the power conversion device described above and a motor. An output of the power conversion device is input to the motor.

The above and other elements, features, steps, characteristics and advantages of the present disclosure will become more apparent from the following detailed description of the preferred embodiments with reference to the attached drawings.

DETAILED DESCRIPTION

Figure 1:
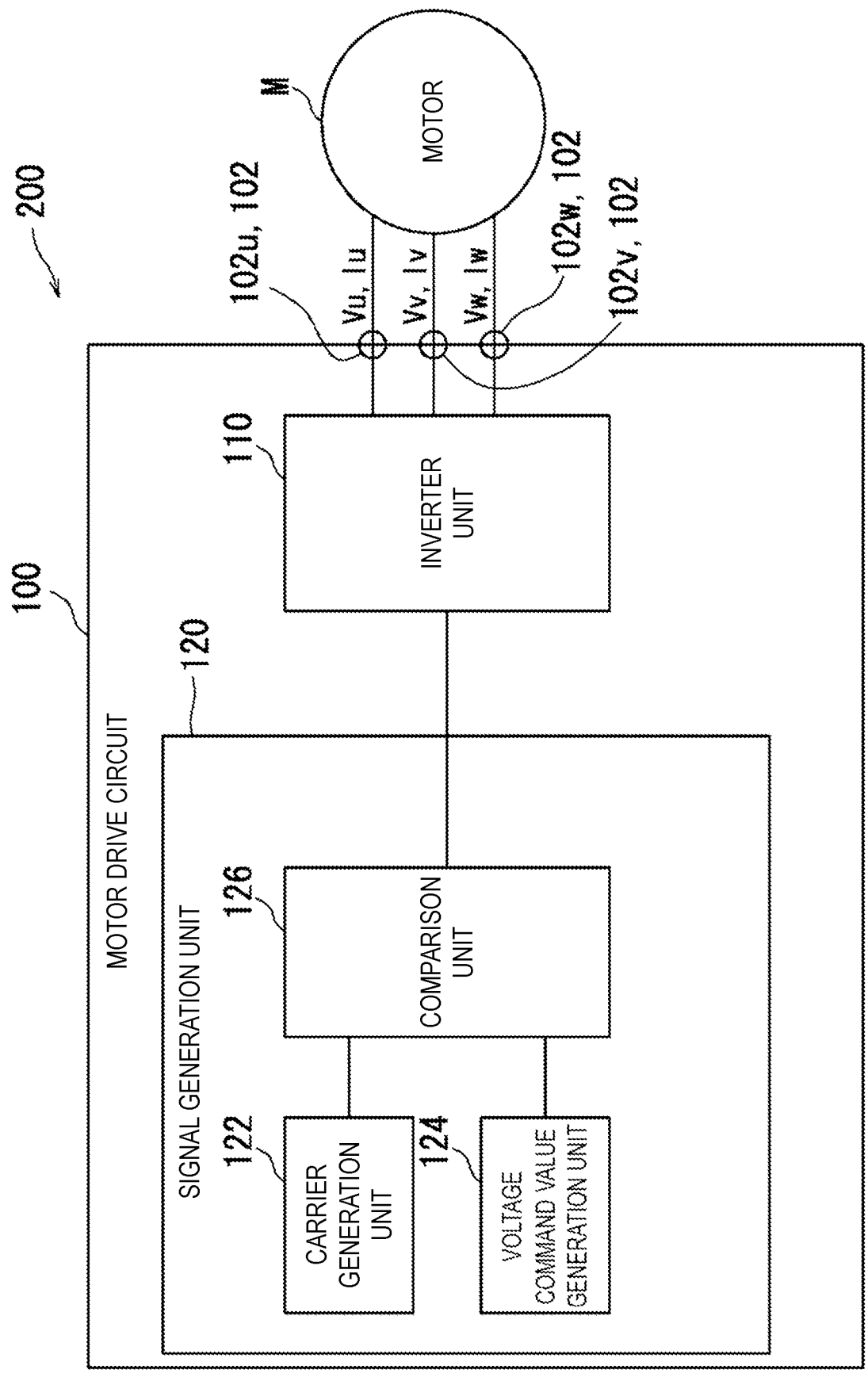
FIG. 1 is a block diagram of a motor module according to an embodiment of the present invention.

Hereinafter, an embodiment of the present invention will be described with reference to the drawings. Note that in the drawings, the same or corresponding parts will be denoted by the same reference signs and description of such parts will not be repeated.

Figure 2:
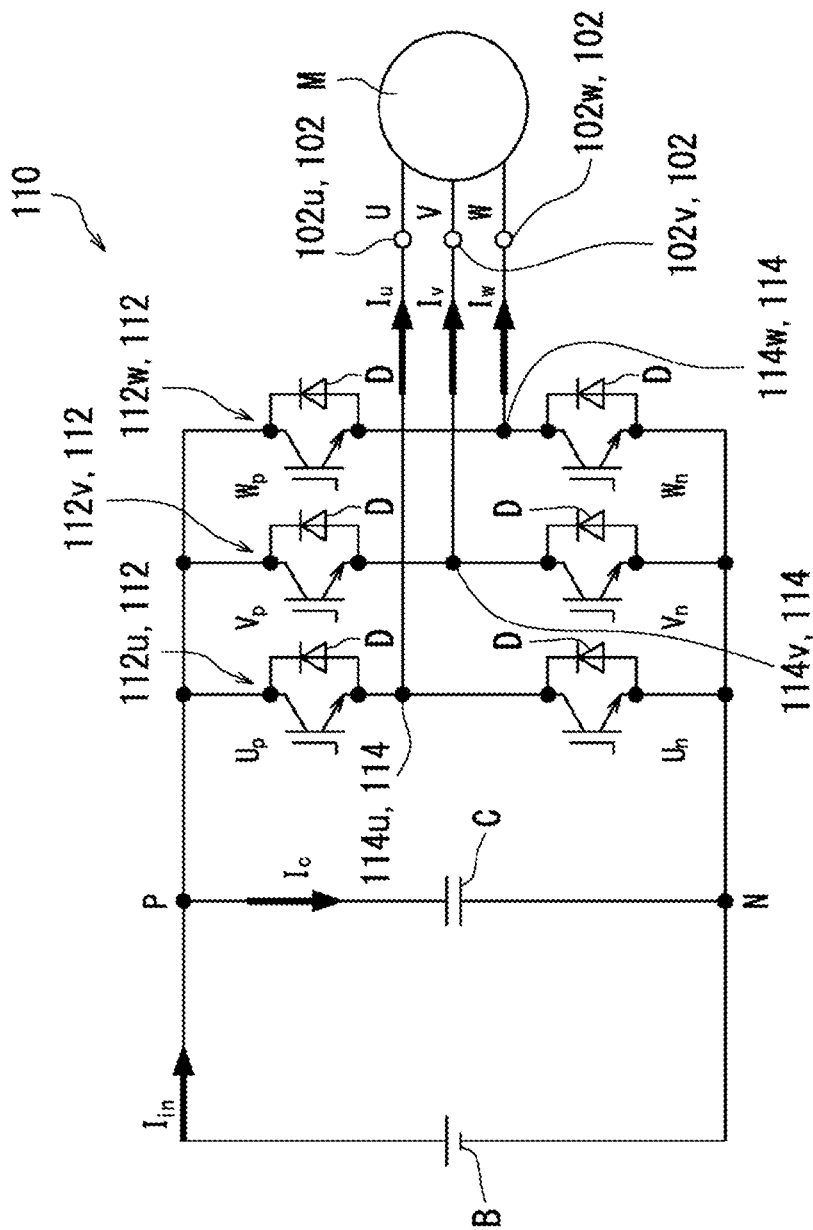
FIG. 2 is a circuit diagram illustrating an inverter unit.

A motor module 200 according to an embodiment of the present invention will be described with reference to FIGS. 1 and 2. FIG. 1 is a block diagram of the motor module 200 according to an embodiment of the present invention. FIG. 2 is a circuit diagram illustrating an inverter unit 110.

As illustrated in FIG. 1, the motor module 200 includes a motor drive circuit 100 and a three-phase motor M. The three-phase motor M is driven by the motor drive circuit 100. The three-phase motor M is, for example, a brushless DC motor. The three-phase motor M has a U phase, a V phase, and a W phase. The output of the motor drive circuit 100 is input to the three-phase motor M. The motor drive circuit 100 corresponds to an example of the "power conversion device".

The motor drive circuit 100 controls drive of the three-phase motor M. The motor drive circuit 100 includes the inverter unit 110 and a signal generation unit 120.

The motor drive circuit 100 converts DC power into n-phase AC power. n is the number of phases of AC output, and is an integer of 3 or more. In the present embodiment, the motor drive circuit 100 converts DC power into three-phase AC power. The motor drive circuit 100 includes n output terminals 102. In the present embodiment, the motor drive circuit 100 includes three output terminals 102. The three output terminals 102 include an output terminal 102u, an output terminal 102v, and an output terminal 102w. The n output terminals 102 output an n-phase output voltage and an n-phase output current. In the present embodiment, the three output terminals 102 output a three-phase output voltage and a three-phase output current to the three-phase motor M. Specifically, the output terminal 102u outputs a U phase output voltage Vu and a U phase output current Iu to the three-phase motor M. The output terminal 102v outputs a V phase output voltage Vv and a V phase output current Iv to the three-phase motor M. The output terminal 102w outputs a W phase output voltage Vw and a W phase output current Iw to the three-phase motor M.

As illustrated in FIG. 2, the motor drive circuit 100 includes a first power supply terminal P, a second power supply terminal N, a capacitor C, and n series bodies 112. In the present embodiment, the motor drive circuit 100 includes the first power supply terminal P, the second power supply terminal N, the capacitor C, and three series bodies 112. More specifically, in the present embodiment, the motor drive circuit 100 includes the inverter unit 110, and the inverter unit 110 includes the first power supply terminal P, the second power supply terminal N, the capacitor C, and the three series bodies 112. The inverter unit 110 further includes a DC voltage source B. Note that the DC voltage source B may be outside the inverter unit 110.

A first voltage V1 is applied to the first power supply terminal P. The first power supply terminal P is connected to a DC voltage source B.

A second voltage V2 is applied to the second power supply terminal N. The second power supply terminal N is connected to the DC voltage source B. The second voltage V2 is lower than the first voltage V1.

The capacitor C is connected between the first power supply terminal P and the second power supply terminal N.

Two semiconductor switching elements are connected in series to the three series bodies 112. The semiconductor switching element is, for example, an insulated gate bipolar transistor (IGBT). Note that the semiconductor switching element may be another transistor such as a field effect transistor. The three series bodies 112 include a series body 112u, a series body 112v, and a series body 112w. The three series bodies 112 are connected in parallel to one another. One end of each of the three series bodies 112 is connected to the first power supply terminal P. The other end of each of the three series bodies 112 is connected to the second power supply terminal N. A rectifier element D is connected in parallel to each of these semiconductor switching elements with the first power supply terminal P side (the upper side in the paper surface) as a cathode and the second power supply terminal N side (the lower side in the paper surface) as an anode. In a case where a field effect transistor is used as the semiconductor switching element, a parasitic diode may be used as this rectifier element.

Each of the three series bodies 112 includes a first semiconductor switching element and a second semiconductor switching element. Specifically, the series body 112u includes a first semiconductor switching element Up and a second semiconductor switching element Un. The series body 112v includes a first semiconductor switching element Vp and a second semiconductor switching element Vn. The series body 112w includes a first semiconductor switching element Wp and a second semiconductor switching element Wn.

The first semiconductor switching element Up, the first semiconductor switching element Vp, and the first semiconductor switching element Wp are connected to the first power supply terminal P. In other words, the first semiconductor switching element Up, the first semiconductor switching element Vp, and the first semiconductor switching element Wp are high-voltage-side semiconductor switching elements.

The second semiconductor switching element Un, the second semiconductor switching element Vn, and the second semiconductor switching element Wn are connected to the second power supply terminal N. In other words, the second semiconductor switching element Un, the second semiconductor switching element Vn, and the second semiconductor switching element Wn are low-voltage-side semiconductor switching elements.

The first semiconductor switching element and the second semiconductor switching element are connected at a connection point 114. Specifically, the first semiconductor switching element Up and the second semiconductor switching element Un are connected at a connection point 114u. The first semiconductor switching element Vp and the second semiconductor switching element Vn are connected at a connection point 114v. The first semiconductor switching element Wp and the second semiconductor switching element Wn are connected at a connection point 114w.

The connection point 114 in each of the three series bodies 112 is connected to the three output terminals 102. Specifically, the connection point 114u in the series body 112u is connected to the output terminal 102u. The connection point 114v in the series body 112v is connected to the output terminal 102v. The connection point 114w in the series body 112w is connected to the output terminal 102w.

A PWM signal is input to the first semiconductor switching element Up, the first semiconductor switching element Vp, and the first semiconductor switching element Wp. The PWM signal is output from the signal generation unit 120. Hereinafter, in the present description, the PWM signal input to the first semiconductor switching element Up may be referred to as an "UpPWM signal". The PWM signal input to the first semiconductor switching element Vp may be referred to as a "VpPWM signal". The PWM signal input to the first semiconductor switching element Wp may be referred to as a "WpPWM signal". The first semiconductor switching element Up, the first semiconductor switching element Vp, and the first semiconductor switching element Wp are switched on and off at a frequency higher than the frequency of the AC output. For example, the first semiconductor switching element Up, the first semiconductor switching element Vp, and the first semiconductor switching element Wp are turned on when the UpPWM signal, the VpPWM signal, and the WpPWM signal are at a HIGH level, respectively. On the other hand, the first semiconductor switching element Up, the first semiconductor switching element Vp, and the first semiconductor switching element Wp are turned off when the UpPWM signal, the VpPWM signal, and the WpPWM signal are at a LOW level, respectively.

A PWM signal is input to the second semiconductor switching element Un, the second semiconductor switching element Vn, and the second semiconductor switching element Wn. The PWM signal is output from the signal generation unit 120. Hereinafter, in the present description, the PWM signal input to the second semiconductor switching element Un may be referred to as an "UnPWM signal". In addition, the PWM signal input to the second semiconductor switching element Vn may be referred to as a "VnPWM signal". The PWM signal input to the second semiconductor switching element Wn may be referred to as a "WnPWM signal". The second semiconductor switching element Un, the second semiconductor switching element Vn, and the second semiconductor switching element Wn are switched on and off at a frequency higher than the frequency of the AC output. For example, the second semiconductor switching element Un, the second semiconductor switching element Vn, and the second semiconductor switching element Wn are turned on when the UnPWM signal, the VnPWM signal, and the WnPWM signal are at the HIGH level, respectively. On the other hand, the second semiconductor switching element Un, the second semiconductor switching element Vn, and the second semiconductor switching element Wn are turned off when the UnPWM signal, the VnPWM signal, and the WnPWM signal are at the LOW level, respectively.

As illustrated in FIG. 1, the signal generation unit 120 includes a carrier generation unit 122, a voltage command value generation unit 124, and a comparison unit 126. The signal generation unit 120 is a hardware circuit including a processor such as a central processing unit (CPU) and an application specific integrated circuit (ASIC). Then, the processor of the signal generation unit 120 functions as the carrier generation unit 122, the voltage command value generation unit 124, and the comparison unit 126 by executing a computer program stored in a storage device.

The signal generation unit 120 controls the inverter unit 110. Specifically, the signal generation unit 120 controls the inverter unit 110 by generating a PWM signal and outputting the PWM signal. More specifically, the signal generation unit 120 generates a PWM signal to be input to each of the three series bodies 112.

The carrier generation unit 122 generates a carrier signal. The carrier signal is, for example, a triangular wave. Note that the carrier signal may be a sawtooth wave.

The voltage command value generation unit 124 generates a voltage command value. The voltage command value corresponds to a voltage value output from the motor drive circuit 100. That is, the voltage command value generation unit 124 generates, as the voltage command value, a voltage value corresponding to the output voltage Vu, the output voltage Vv, and the output voltage Vw.

The comparison unit 126 generates a PWM signal by comparing a carrier signal with a voltage command value.

The signal generation unit 120 modulates a sine wave based on the modulation factor. More specifically, in the present embodiment, the voltage command value generation unit 124 modulates a sine wave based on the modulation factor. In the following description, the modulation factor when the amplitude of the sine wave is $1/(\sqrt{3})$ is defined as 1.

Figure 3A:
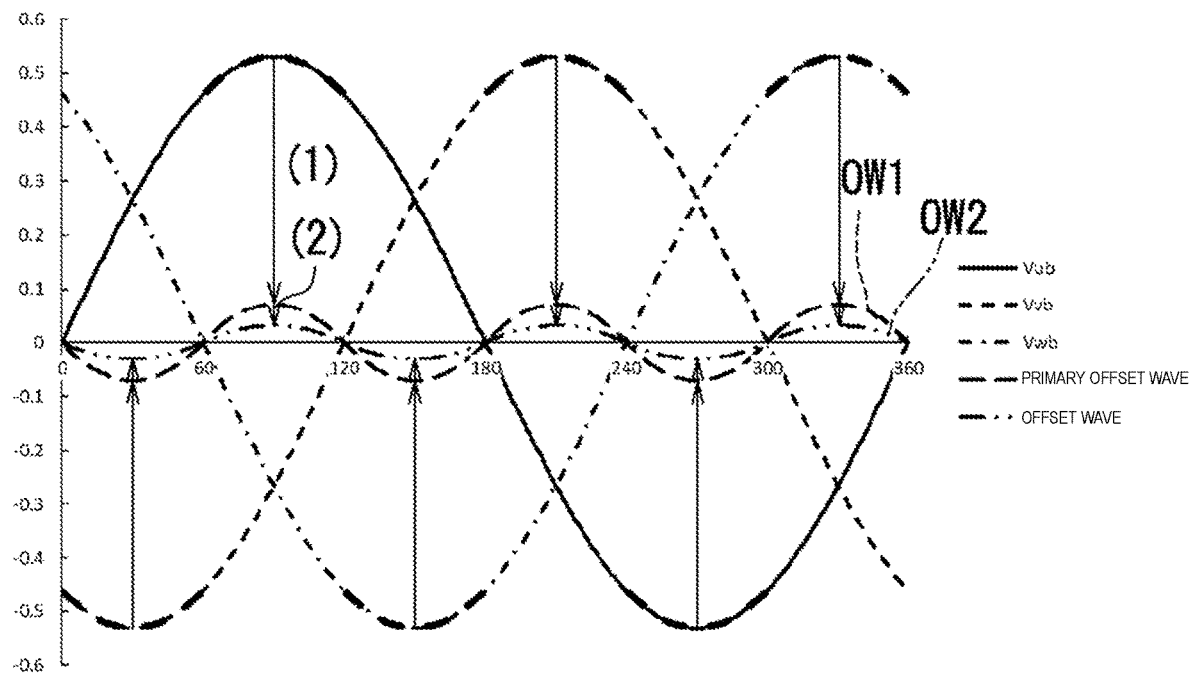
FIG. 3A is a view illustrating a sinusoidal waveform, a primary offset wave, and an offset wave.
Figure 3B:
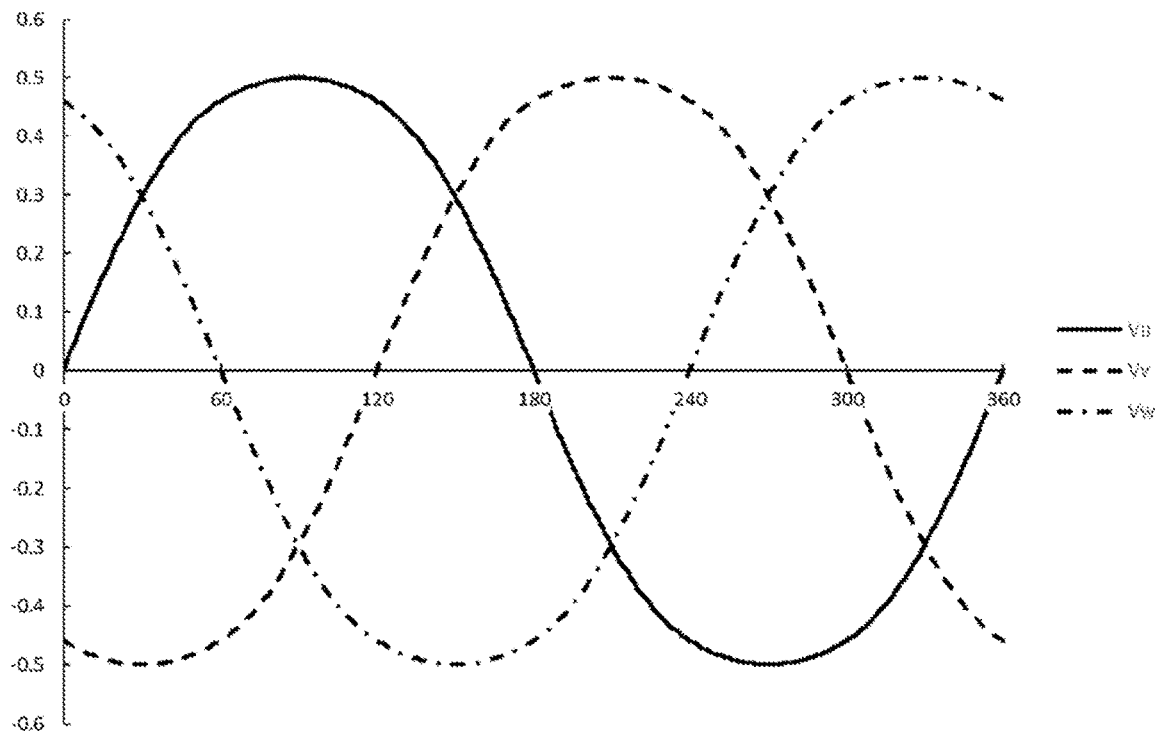
FIG. 3B is a view illustrating an output voltage after modulation.

Next, a modulation method of a sine wave will be described with reference to FIGS. 3A and 3B. FIG. 3A is a view illustrating a sinusoidal waveform Vub, a sinusoidal waveform Vvb, a sinusoidal waveform Vwb, a primary offset wave OW1, and an offset wave OW2. FIG. 3B is a view illustrating the output voltage Vu, the output voltage Vv, and the output voltage Vw after modulation. In FIG. 3A, the sinusoidal waveform Vub is indicated by a solid line, the sinusoidal waveform Vvb is indicated by a broken line, and the sinusoidal waveform Vwb is indicated by a one-dot chain line. In FIG. 3B, the output voltage Vu is indicated by a solid line, the output voltage Vv is indicated by a broken line, and the output voltage Vw is indicated by a one-dot chain line. The vertical axes in FIGS. 3A and 3B represent voltage values normalized by an input voltage V1-V2, and the output voltage of each phase has a value in a range of 0 to 1. This value also represents a duty value, which is a ratio of ON time of the first semiconductor switching element of each phase to a PWM cycle. When the second semiconductor switching element is switched, a value obtained by subtracting the value of the vertical axis from 1 becomes the ratio of ON time of the second semiconductor switching element to the PWM cycle. When both the first semiconductor switching element and the second semiconductor switching element are switched, switching is performed complementarily after providing an appropriate dead time in order to prevent both from being turned on simultaneously. The horizontal axes in FIGS. 3A and 3B represent electrical rotation angles of the motor, and the unit is degree.

As illustrated in FIG. 3A, the sinusoidal waveform Vub, the sinusoidal waveform Vvb, and the sinusoidal waveform Vwb are sinusoidal. The sinusoidal waveform Vvb is deviated in phase by 120 degrees with respect to the sinusoidal waveform Vub. The sinusoidal waveform Vwb is deviated in phase by 120 degrees with respect to the sinusoidal waveform Vvb. The sinusoidal waveform Vub is deviated in phase by 120 degrees with respect to the sinusoidal waveform Vwb.

As illustrated in (1) of FIG. 3A, the maximum waveform of the sinusoidal waveforms of all the phases and the minimum waveform of the sinusoidal waveforms of all the phases are switched every 60 degrees, moved in the amplitude value direction, and coupled on the Y axis, and the signal generation unit 120 generates the primary offset wave OW1. In the present description, the "maximum waveform of the sinusoidal waveforms of all the phases" may be referred to as the "maximum waveform". In the present description, the "minimum waveform of the sinusoidal waveforms of all the phases" may be referred to as the "minimum waveform".

Specifically, the signal generation unit 120 moves the maximum waveform in the amplitude value direction at an electrical angle of 60 degrees to 120 degrees, an electrical angle of 180 degrees to 240 degrees, and an electrical angle of 300 degrees to 360 degrees. When the amplitude of the sine wave is A, the movement amount is $A \times (\sqrt{3})/2$.

The signal generation unit 120 moves the minimum waveform in the amplitude value direction at an electrical angle of 0 degrees to 60 degrees, an electrical angle of 120 degrees to 180 degrees, and an electrical angle of 240 degrees to 360 degrees. When the amplitude of the sine wave is A, the movement amount is $A \times (\sqrt{3})/2$.

Next, as illustrated in (2) of FIG. 3A, the signal generation unit 120 generates the offset wave OW2 by multiplying the amplitude of the primary offset wave OW1 by K. The coefficient K is $K=(A-0.5)/A\{1-(\sqrt{3})/2\}$. When $A \leq 0.5$, $K=0$. At $A=1/\sqrt{3}$, that is, a modulation factor of 1, $K=1$. When $A>1/\sqrt{3}$ (overmodulation), K is fixed at, for example, $K=1$.

Next, when the offset wave OW2 is subtracted from the sinusoidal waveform of each phase (the sinusoidal waveform Vub, the sinusoidal waveform Vvb, and the sinusoidal waveform Vwb), a waveform after modulation contacting ±0.5 is obtained as illustrated in FIG. 3B. That is, the waveform of the output voltage of each phase is a waveform obtained by subtracting the common offset wave OW2 from the sinusoidal waveform (the sinusoidal waveform Vub, the sinusoidal waveform Vvb, and the sinusoidal waveform Vwb).

As described above with reference to FIGS. 3A and 3B, the waveform of the output voltage of each phase is a waveform obtained by subtracting the common offset wave OW2 from the sinusoidal waveform (the sinusoidal waveform Vub, the sinusoidal waveform Vvb, and the sinusoidal waveform Vwb). The waveform of the offset wave OW2 matches the product of the maximum waveform and the minimum waveform of the sinusoidal waveform (the sinusoidal waveform Vub, the sinusoidal waveform Vvb, and the sinusoidal waveform Vwb) moved and connected in the amplitude value direction and multiplied by the coefficient. The maximum waveform indicates the maximum waveform of the sinusoidal waveforms of all the phases. The minimum waveform indicates the minimum waveform of the sinusoidal waveforms of all the phases. Therefore, noise can be suppressed by suppressing high-order harmonics. Therefore, it becomes easy to calculate the offset wave.

Figure 4A:
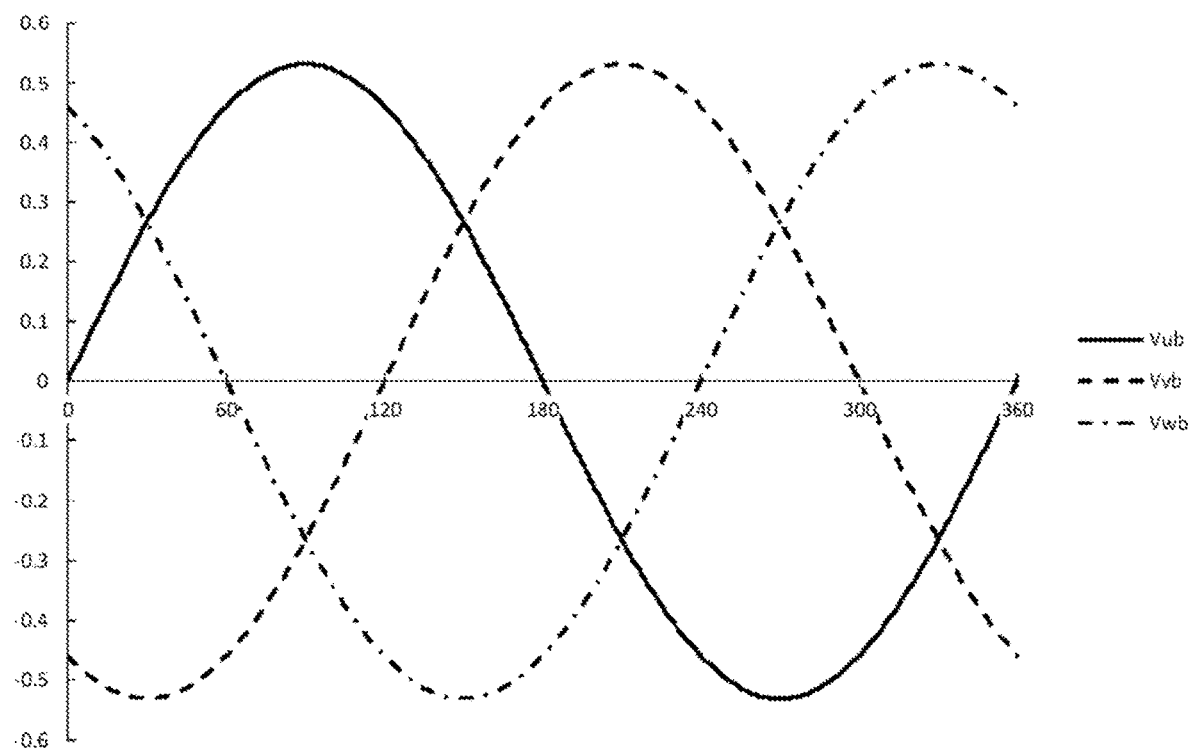
FIG. 4A is a view illustrating a sinusoidal waveform.
Figure 4B:
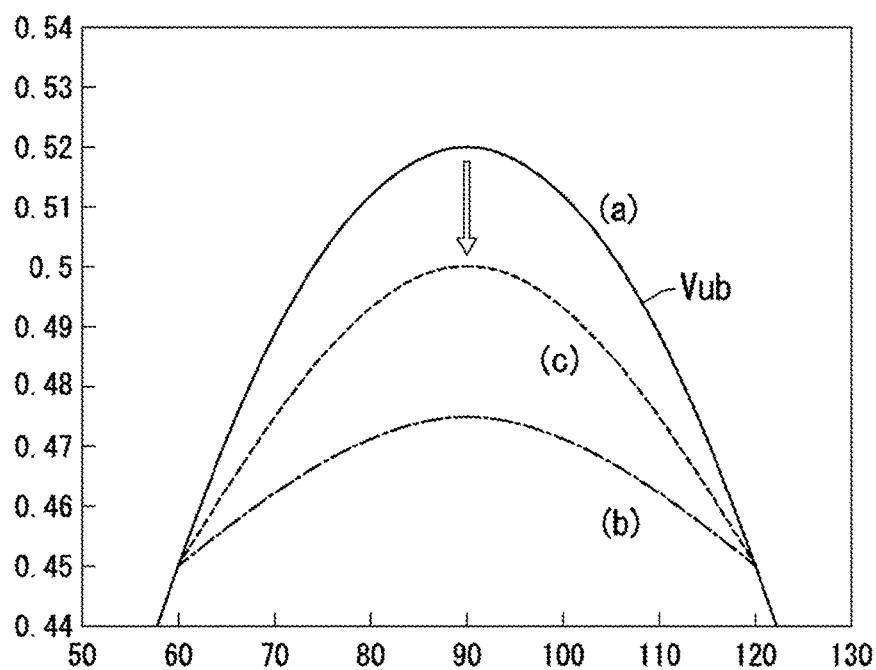
FIG. 4B is an enlarged view of a vicinity of an electrical angle of 60 degrees.

The coefficient K will now be described further with reference to FIGS. 4A and 4B. FIG. 4A is a view illustrating the sinusoidal waveform Vub, the sinusoidal waveform Vvb, and the sinusoidal waveform Vwb. FIG. 4B is an enlarged view of the vicinity of the electrical angle of 60 degrees.

As illustrated in FIG. 4A, focusing on the electrical angle of 60 degrees, since the inclination of the minimum waveform (V phase) and the inclination of the maximum waveform (U phase) match, a cut out waveform can be smoothly connected.

Here, it is considered to generate an offset wave (b) using a waveform (a) obtained by cutting out the sinusoidal waveform Vub in the range of the electrical angle of 60 degrees to the electrical angle of 120 degrees and to obtain a modulation waveform (c) (peak=±0.5). Assuming that the amplitude of the sinusoidal waveform Vub is A, (b) is subtracted from (a) having the height $A-A(\sqrt{3})/2$ when the point $A(\sqrt{3})/2$ of the electrical angle 60 degrees is used as a reference to obtain (c) having the height $0.5-A(\sqrt{3})/2$, and therefore the height of (b) is $A-0.5$. When (b) is generated by multiplying (a) by K, K is a height ratio, that is, $K=(A-0.5)/A\{1-(\sqrt{3})/2\}$.

Figure 5A:
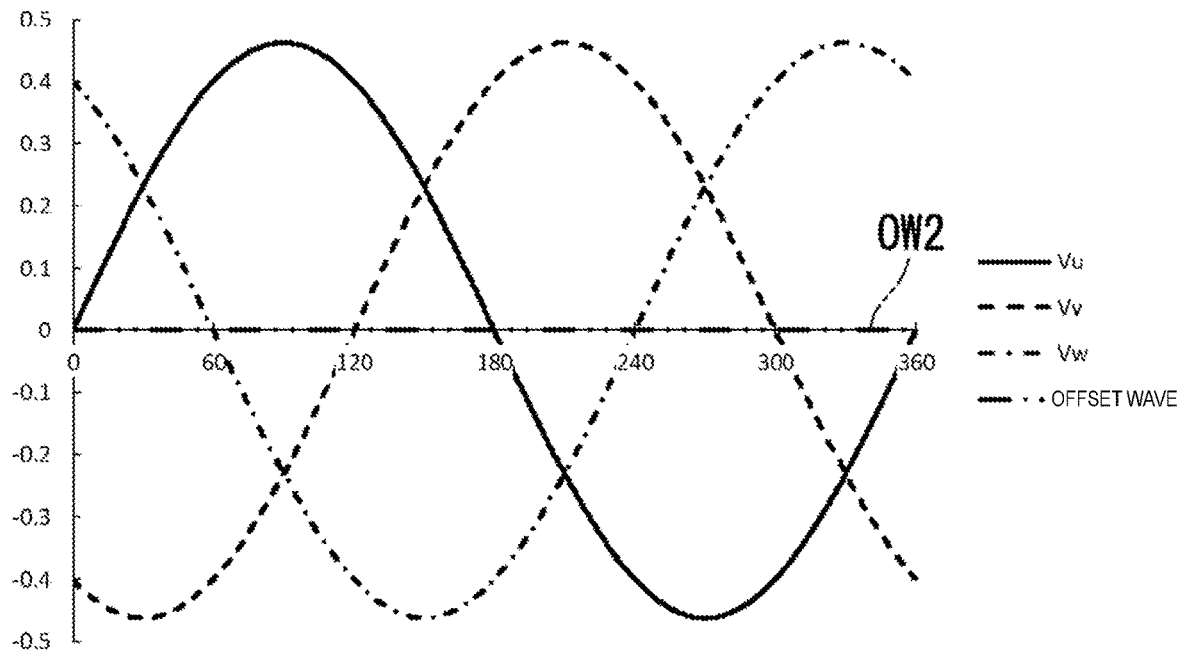
FIG. 5A is a view illustrating an output voltage and an offset wave after modulation.
Figure 5B:
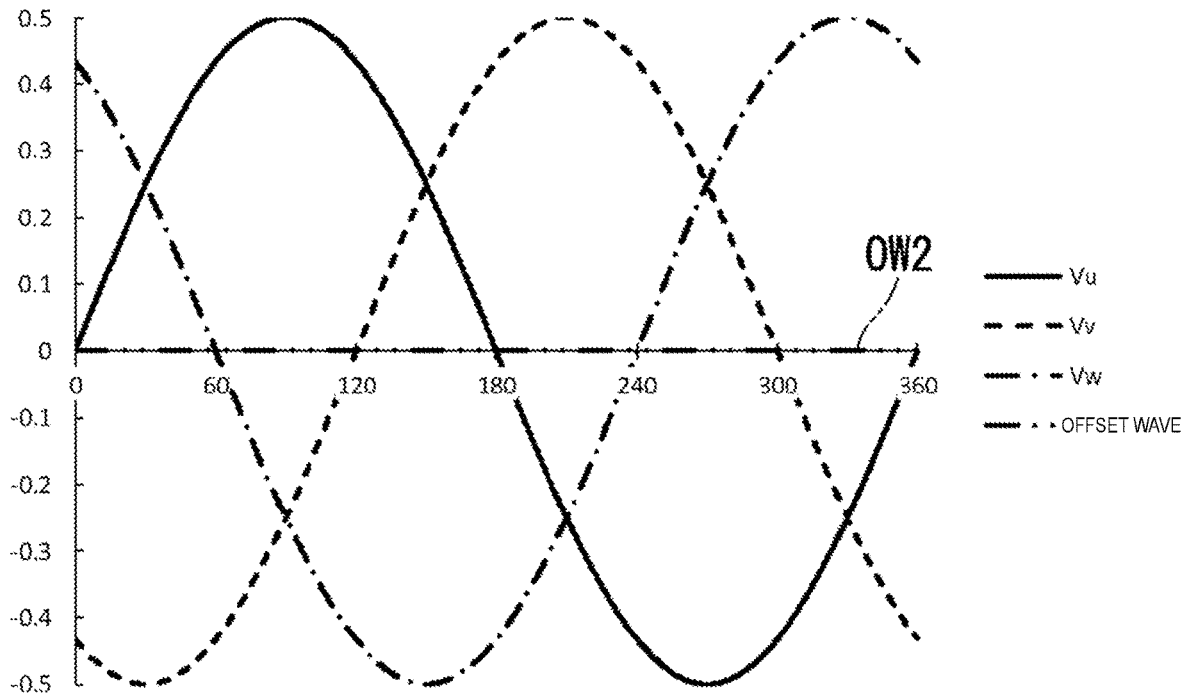
FIG. 5B is a view illustrating an output voltage and an offset wave after modulation.
Figure 6A:
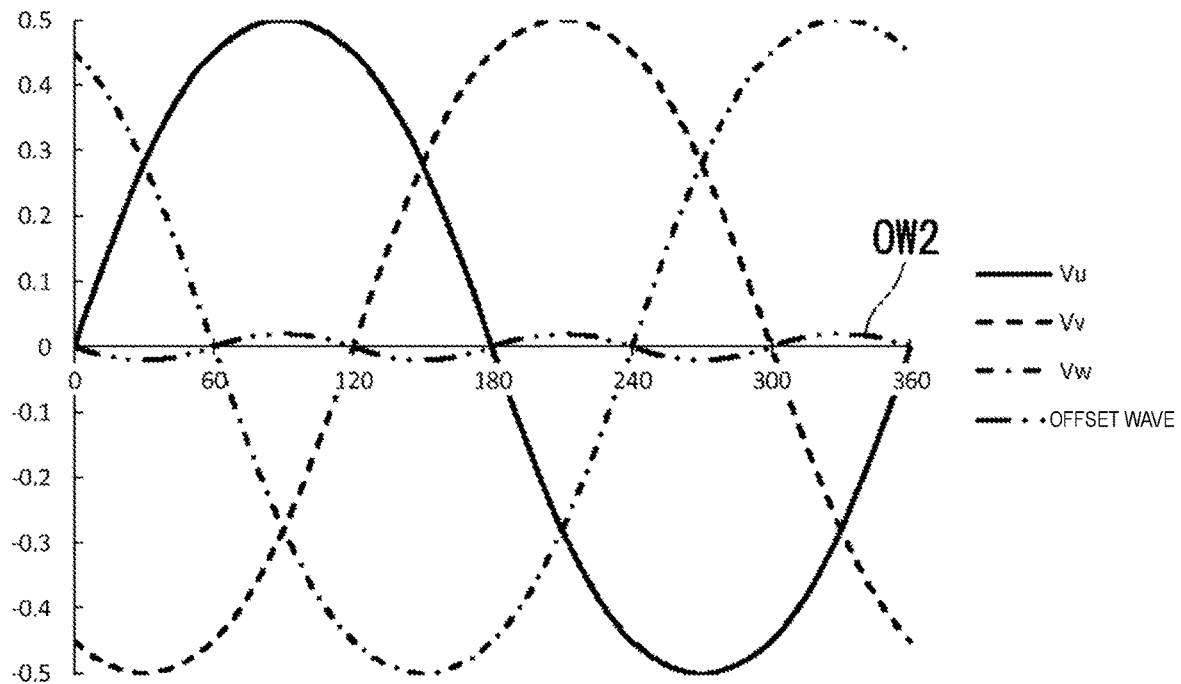
FIG. 6A is a view illustrating an output voltage and an offset wave after modulation.
Figure 6B:
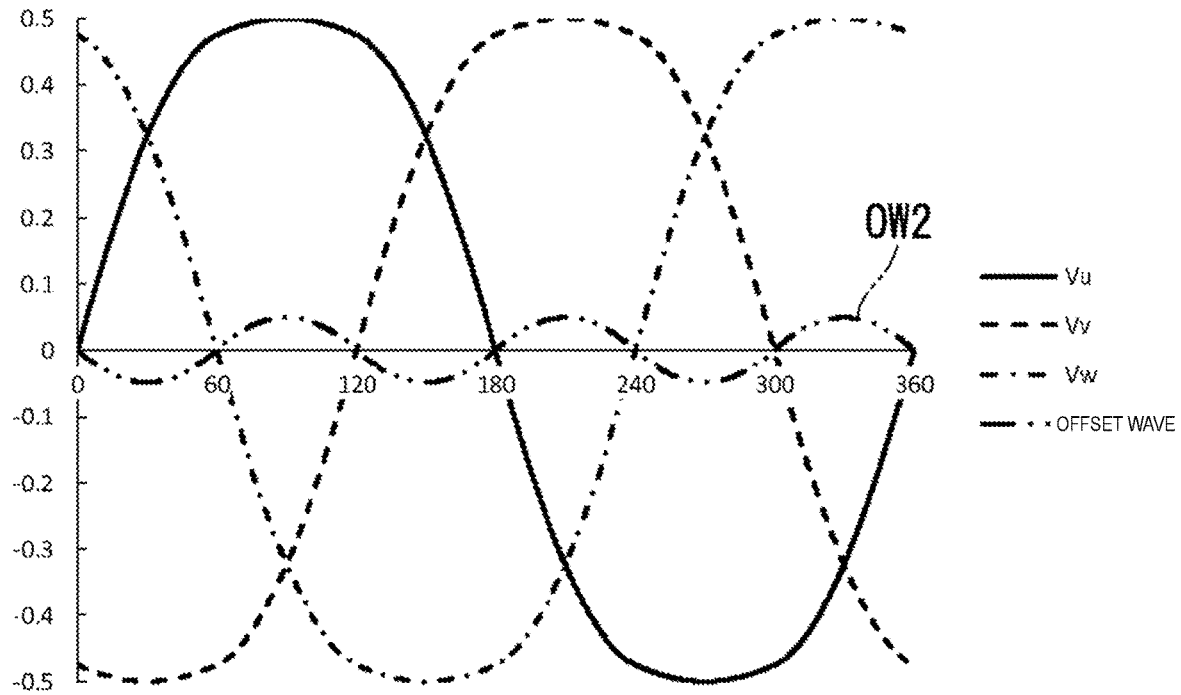
FIG. 6B is a view illustrating an output voltage and an offset wave after modulation.
Figure 7:
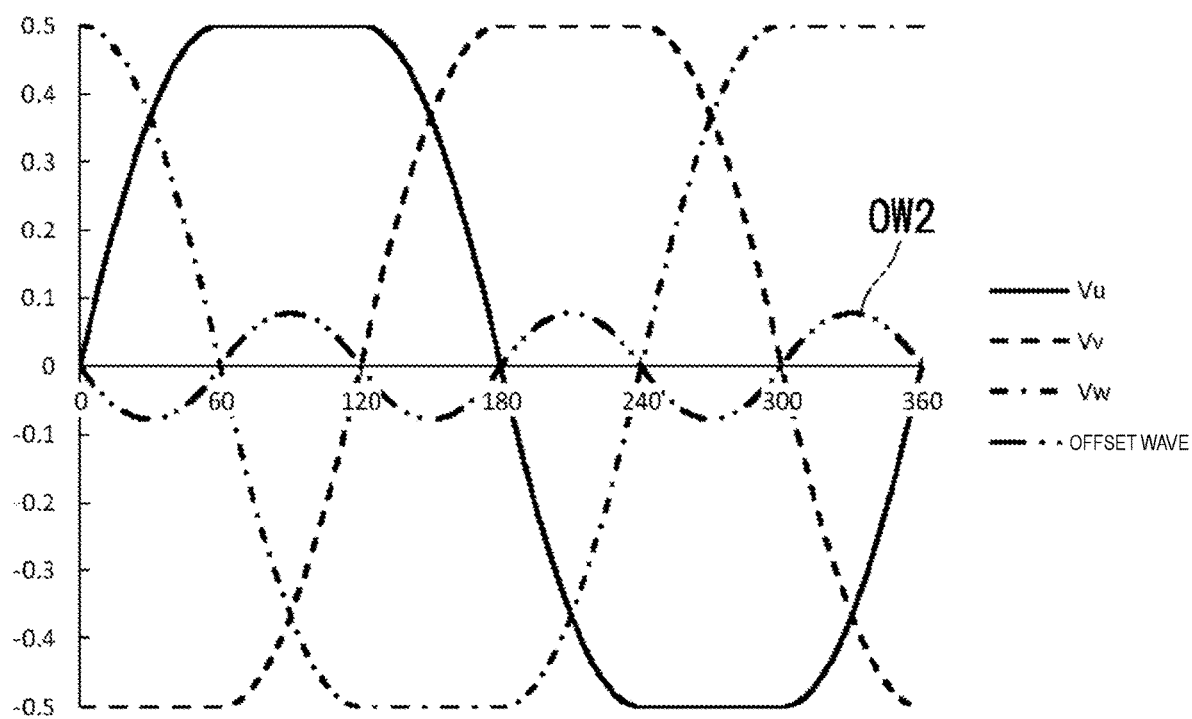
FIG. 7 is a view illustrating an output voltage and an offset wave after modulation.

Next, an output voltage in a case where the modulation factor is changed will be described with reference to FIGS. 5A to 7. FIGS. 5A to 7 are views illustrating the output voltage Vu, the output voltage Vv, the output voltage Vw, and the offset wave OW2 after modulation. FIG. 5A illustrates an output voltage in a case of the modulation factor of 0.8. FIG. 5B illustrates an output voltage in a case of the modulation factor of $(\sqrt{3})/2$. FIG. 6A illustrates an output voltage in a case of the modulation factor of 0.9. FIG. 6B illustrates an output voltage in a case of the modulation factor of 0.95. FIG. 7 illustrates an output voltage in a case of the modulation factor of 1.

As illustrated in FIG. 5A, at the modulation factor 0.8, the output voltage (the output voltage Vu, the output voltage Vv, and the output voltage Vw) becomes a sine wave.

As illustrated in FIG. 5B, at the modulation factor $(\sqrt{3})/2$, the output voltage (the output voltage Vu, the output voltage Vv, and the output voltage Vw) becomes a sine wave. At the modulation factor $(\sqrt{3})/2$, the amplitude becomes the maximum amplitude in the sine wave.

As illustrated in FIGS. 5A and 5B, when the modulation factor is a low modulation factor of equal to or less than $(\sqrt{3})/2$, the output voltage becomes a sinusoidal output. The modulation factor $(\sqrt{3})/2$ is an example of the "first modulation factor". That is, at a low modulation factor that is equal to or less than a first modulation factor, the output voltage becomes a sinusoidal output.

As illustrated in FIG. 6A, at the modulation factor 0.9, the output voltage (the output voltage Vu, the output voltage Vv, and the output voltage Vw) is transformed from a sine wave so as to be between the maximum voltage (+0.5) and the minimum voltage (−0.5). For example, at the electrical angle of 30 degrees, the output voltage Vv becomes the minimum voltage. At the electrical angle of 90 degrees, the output voltage Vu becomes the maximum voltage. At the electrical angle of 150 degrees, the output voltage Vw becomes the minimum voltage. At the electrical angle of 210 degrees, the output voltage Vu becomes the maximum voltage. At the electrical angle of 270 degrees, the output voltage Vu becomes the minimum voltage. At the electrical angle of 330 degrees, the output voltage Vu becomes the maximum voltage.

As illustrated in FIG. 6B, at the modulation factor 0.95, the output voltage (the output voltage Vu, the output voltage Vv, and the output voltage Vw) is transformed from a sine wave so as to be between the maximum voltage (+0.5) and the minimum voltage (−0.5). For example, at the electrical angle of 30 degrees, the output voltage Vv becomes the minimum voltage. At the electrical angle of 90 degrees, the output voltage Vu becomes the maximum voltage. At the electrical angle of 150 degrees, the output voltage Vw becomes the minimum voltage. At the electrical angle of 210 degrees, the output voltage Vu becomes the maximum voltage. At the electrical angle of 270 degrees, the output voltage Vu becomes the minimum voltage. At the electrical angle of 330 degrees, the output voltage Vu becomes the maximum voltage. The output voltage with the modulation factor 0.95 illustrated in FIG. 6B is smaller than the output voltage with the modulation factor 0.9 illustrated in FIG. 6A in terms of the curvatures of the output voltage waveforms near the maximum voltage (+0.5) and near the minimum voltage (−0.5).

As illustrated in FIG. 7, at the modulation factor 1, in the output voltage (the output voltage Vu, the output voltage Vv, and the output voltage Vw), a part of the sine wave is fixed to the maximum voltage (+0.5) or a part of the sine wave is fixed to the minimum voltage (−0.5). For example, at the electrical angle of 0 degrees to the electrical angle of 60 degrees, the output voltage Vu is fixed to the minimum voltage. At the electrical angle of 60 degrees to the electrical angle of 120 degrees, the output voltage Vu is fixed to the maximum voltage. At the electrical angle of 120 degrees to the electrical angle of 180 degrees, the output voltage Vw is fixed to the minimum voltage. At the electrical angle of 180 degrees to the electrical angle of 240 degrees, the output voltage Vv is fixed to the maximum voltage. At the electrical angle of 240 degrees to the electrical angle of 300 degrees, the output voltage Vu is fixed to the minimum voltage. At the electrical angle of 300 degrees to the electrical angle of 360 degrees, the output voltage Vw is fixed to the maximum voltage. Thus, at the modulation factor 1, the output voltage is switched every electrical angle of 90 degrees (π/n) between the phase in which the output voltage is fixed to the maximum voltage and the phase in which the output voltage is fixed to the minimum voltage. The modulation factor 1 is an example of the "second modulation factor". The second modulation factor is larger than the first modulation factor. That is, at the second modulation factor, the output voltage is switched every electrical angle it/n between the phase in which the output voltage is fixed to the maximum voltage and the phase in which the output voltage is fixed to the minimum voltage. Therefore, noise can be suppressed by suppressing high-order harmonics.

The maximum voltage substantially matches the first voltage. At this time, in a period in which the output voltage becomes the maximum voltage output, the first semiconductor switching element of the phase in which the output voltage becomes the maximum voltage output can be fixed to ON. Therefore, switching loss can be suppressed.

The minimum voltage substantially matches the second voltage. At this time, in a period in which the output voltage becomes the minimum voltage output, the second semiconductor switching element of the phase in which the output voltage becomes the minimum voltage output can be fixed to ON. Therefore, switching loss can be suppressed.

As illustrated in FIGS. 5A to 7, with an increase in the modulation factor, there is a continuous change from a first state (the state illustrated in FIGS. 5A and 5B) where the output voltage becomes a sinusoidal output to a second state (the state illustrated in FIG. 7) where the phase in which the output voltage is fixed to the maximum voltage and the phase in which the output voltage is fixed to the minimum voltage are switched every electrical angle it/n. Therefore, noise can be suppressed by suppressing high-order harmonics.

Figure 8A:
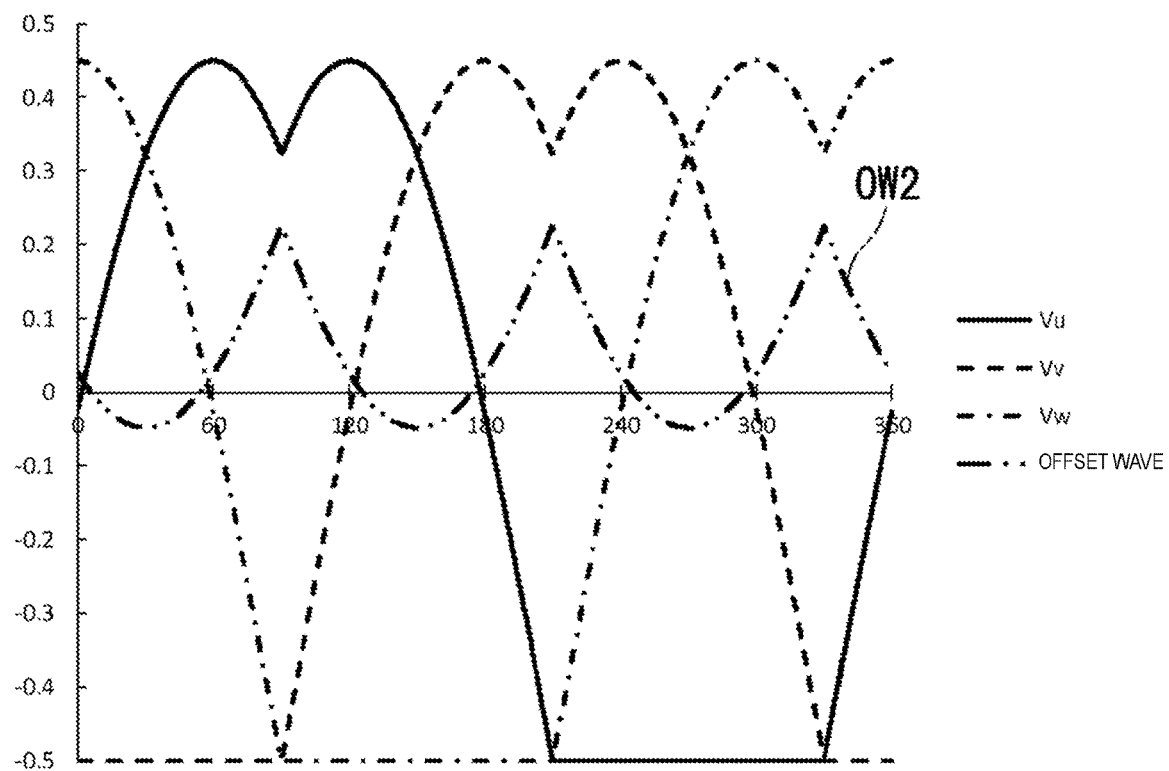
FIG. 8A is a view illustrating an output voltage and an offset wave of a comparative example.
Figure 8B:
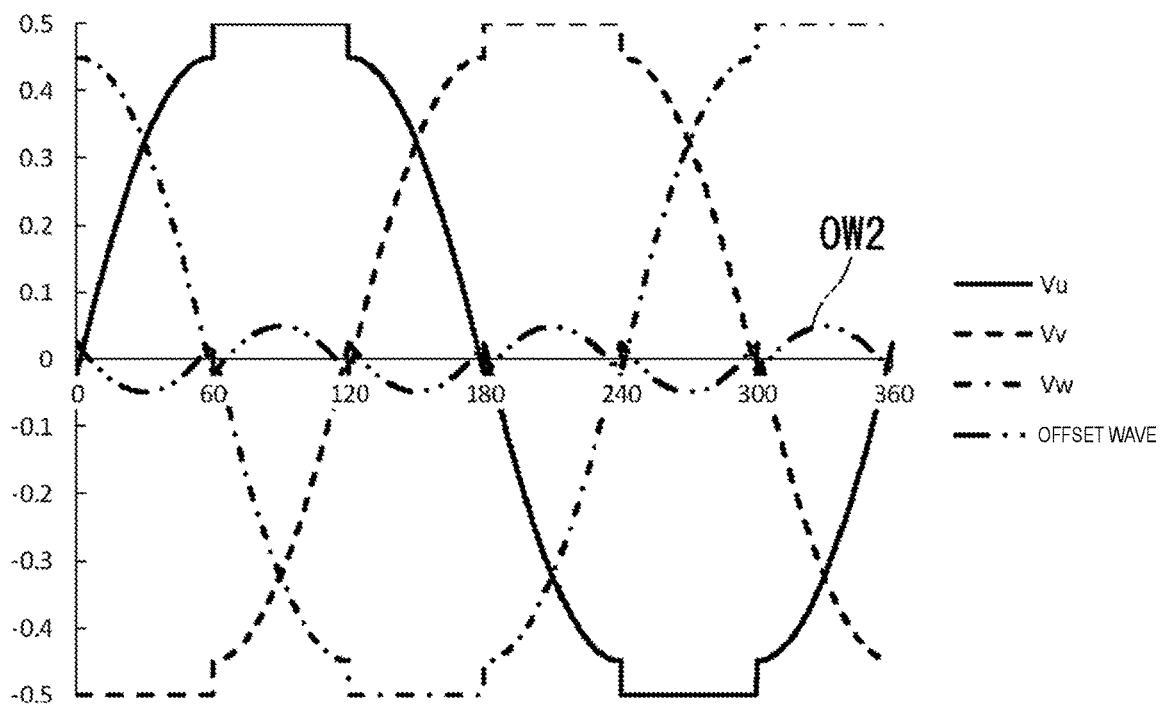
FIG. 8B is a view illustrating an output voltage and an offset wave of a comparative example.
Figure 9A:
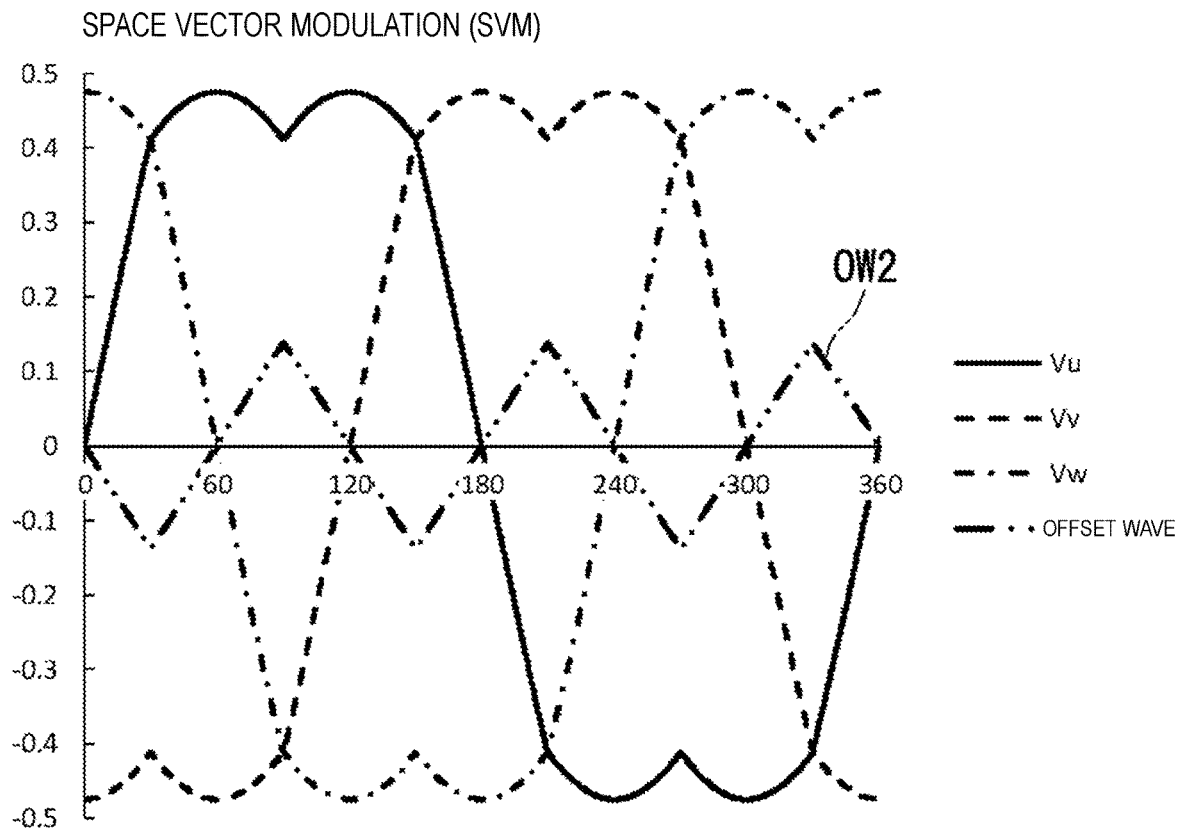
FIG. 9A is a view illustrating an output voltage and an offset wave of a comparative example.
Figure 9B:
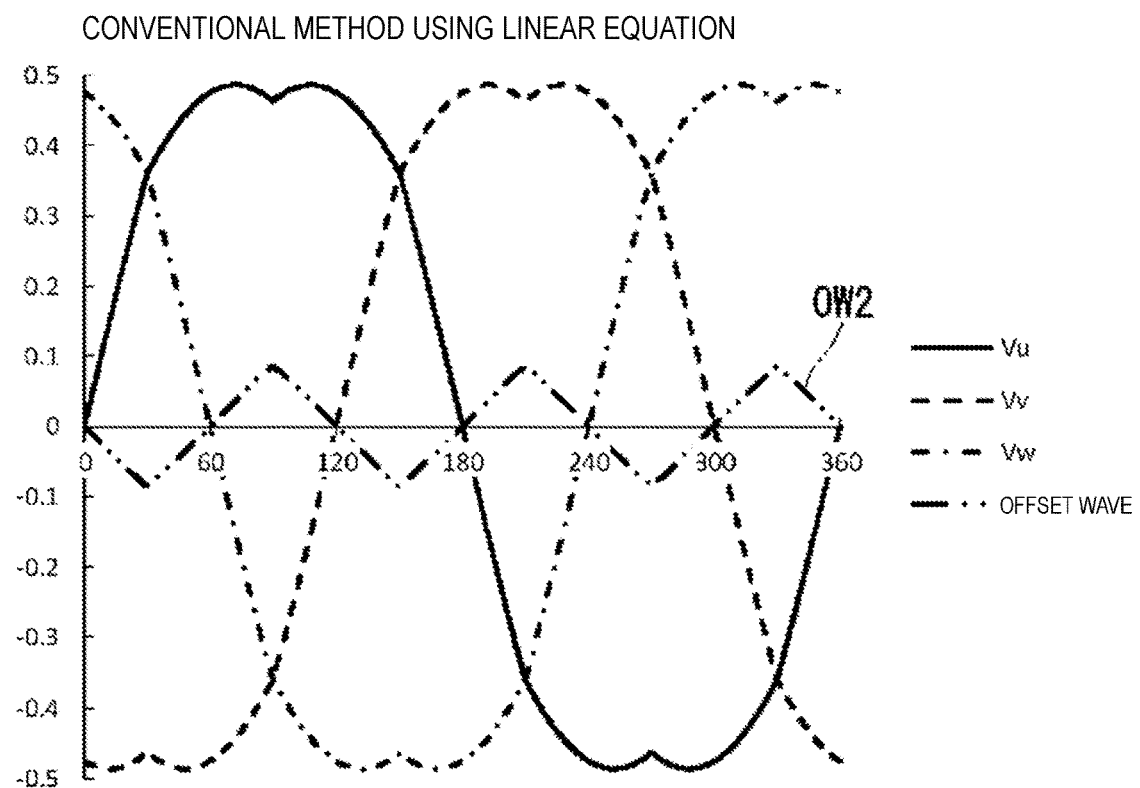
FIG. 9B is a view illustrating an output voltage and an offset wave of a comparative example.
Figure 10A:
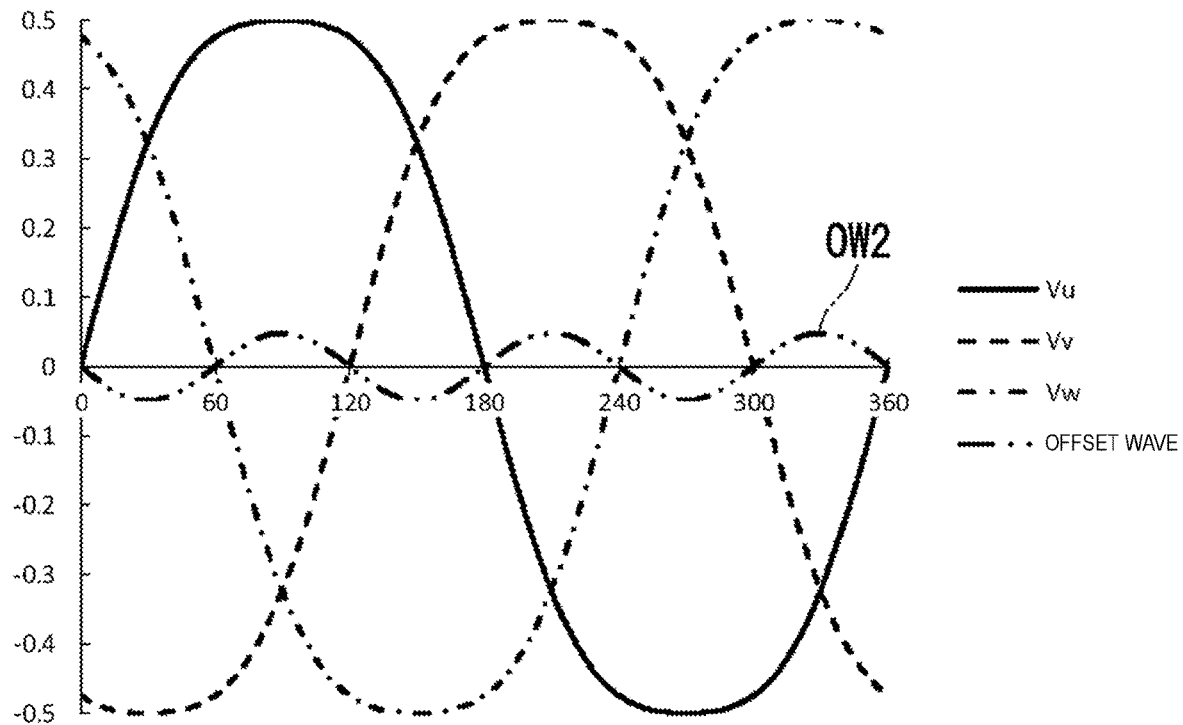
FIG. 10A is a view illustrating an output voltage and an offset wave of a comparative example.
Figure 10B:
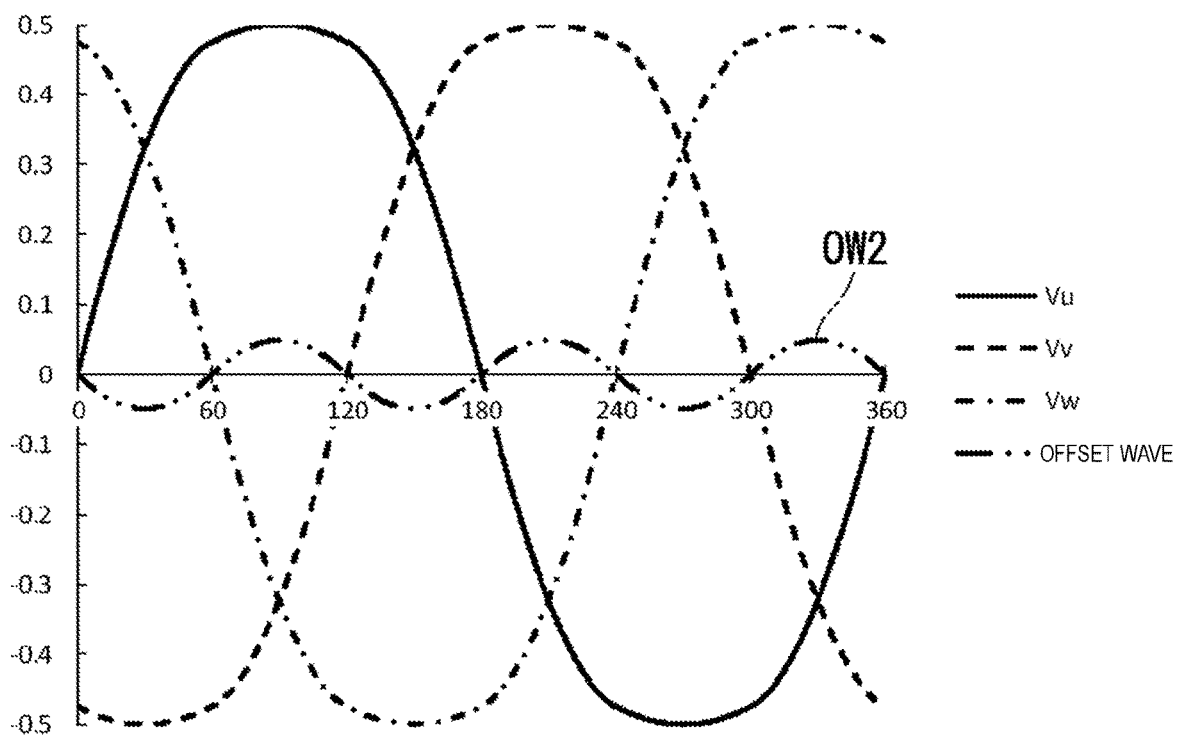
FIG. 10B is a view illustrating an output voltage and an offset wave of the present invention.

The peak to peak voltage of the offset wave will now be described with reference to FIGS. 8A to 11. FIGS. 8A to 10A are views illustrating an output voltage and an offset wave of a comparative example. Specifically, FIG. 8A illustrates a two-phase modulation Min type output voltage and an offset wave. FIG. 8B illustrates a two-phase modulation MinMax type output voltage and an offset wave. FIG. 9A illustrates a space vector modulation (SVM) output voltage and an offset wave. FIG. 9B illustrates an output voltage and an offset wave of a conventional method using a linear equation. The conventional method using a linear equation is one in which an intermediate value of the three-phase output voltages is multiplied by 0.5 and further multiplied by a superimposition amount in accordance with the modulation factor is subtracted from each phase output voltage. The relationship between the modulation factor and the superimposition amount is a superimposition amount 0 at the modulation factor ($\sqrt{\phantom{3}}$ 3)/2 or less, and, at the modulation factors ($\sqrt{\phantom{3}}$ 3)/2 to 1, the superimposition amount is a value proportional to a value obtained by subtracting ($\sqrt{\phantom{3}}$ 3)/2 from the modulation factor. FIG. 10A illustrates an output voltage and an offset wave on which a third-order harmonic wave is superimposed. FIG. 10B is a view illustrating an output voltage and an offset wave of the present invention.

Figure 11:
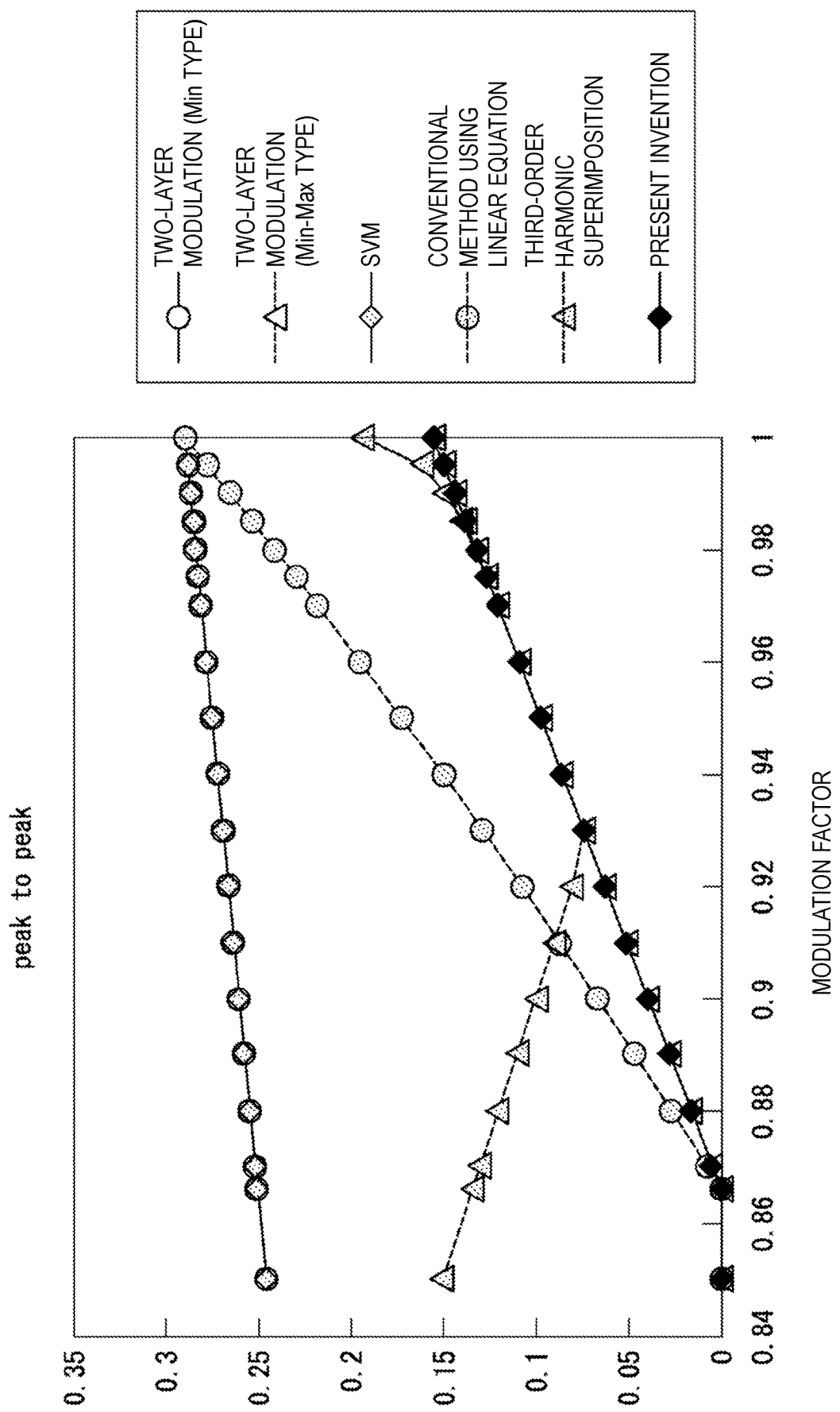
FIG. 11 is a view illustrating amplitude in a voltage direction of an offset wave as a peak to peak voltage.

FIG. 11 is a view illustrating the amplitude in a voltage direction of an offset wave as a peak to peak voltage. In FIG. 11, the horizontal axis represents the modulation factor, and the vertical axis represents the peak to peak voltage. The offset wave matches an average of the output voltages of all phases in a non-overmodulation state, that is, represents a common voltage of the output. This represents that the smaller the peak to peak voltage on the vertical axis is, the smaller the fluctuation of the output common potential is, and the noise caused by the fluctuation of the output common potential is suppressed.

As illustrated in FIG. 11, at the modulation factors of 0.91 to 0.98, the two-phase modulation MinMax type illustrated in FIG. 8B and the third-order harmonic wave superimposition illustrated in FIG. 10A are equivalent to the present invention illustrated in FIG. 10B. However, in the two-phase modulation MinMax type, the peak to peak voltage deteriorates at a low modulation factor. In the third-order harmonic wave superimposition, the peak to peak voltage of the offset wave deteriorates at a high modulation factor. In the conventional method using a linear equation, the peak to peak voltage of the offset wave deteriorates more than that in the two-phase modulation MinMax type and the third-order harmonic wave superimposition, and as the modulation factor becomes high, the peak to peak voltage of the offset wave remarkably increases. In the two-phase modulation Min type and the space vector modulation (SVM), the peak to peak voltage of the offset wave deteriorates more than that in the linear equation of JP 2005-45846 A. Thus, in the present invention, the peak to peak voltage of the offset wave can be suppressed in the entire region.

In the examples described with reference to FIGS. 1 to 11, the number of phases of the AC output is 3, but the number of phases of the AC output may be an odd number of 5 or more. For example, the number of phases of the AC output may be 5.

Figure 12A:
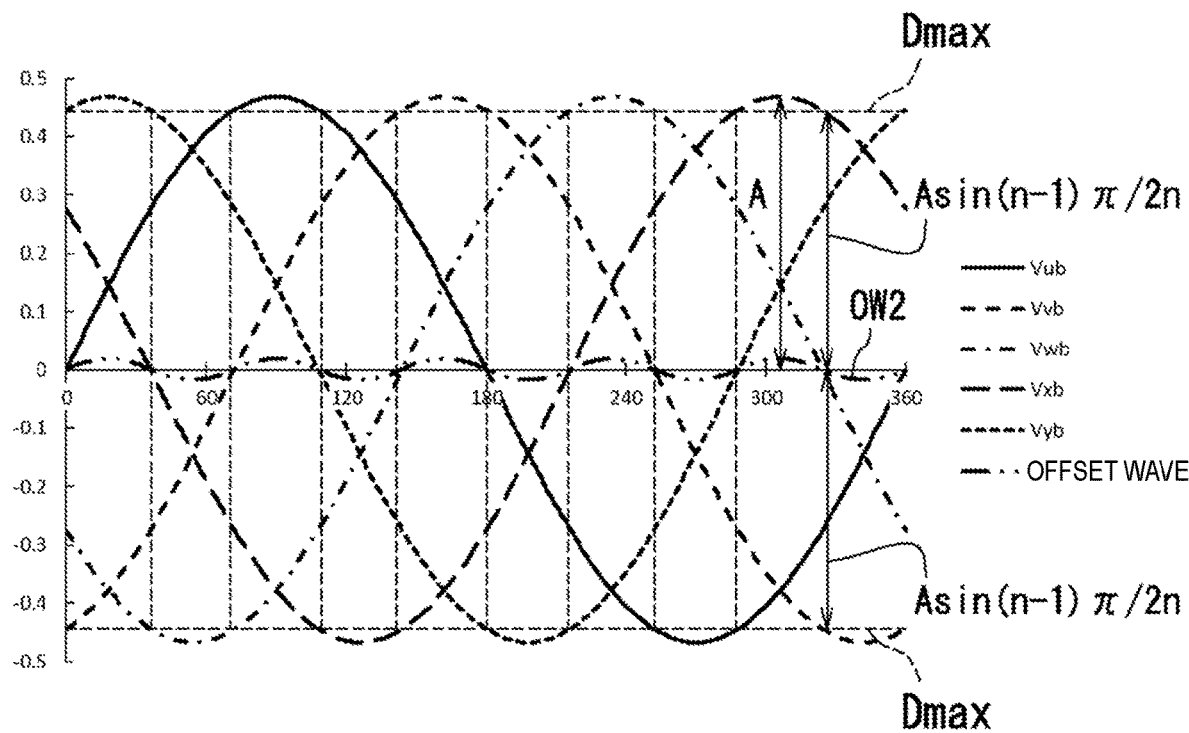
FIG. 12A is a view illustrating a sinusoidal waveform and an offset wave.
Figure 12B:
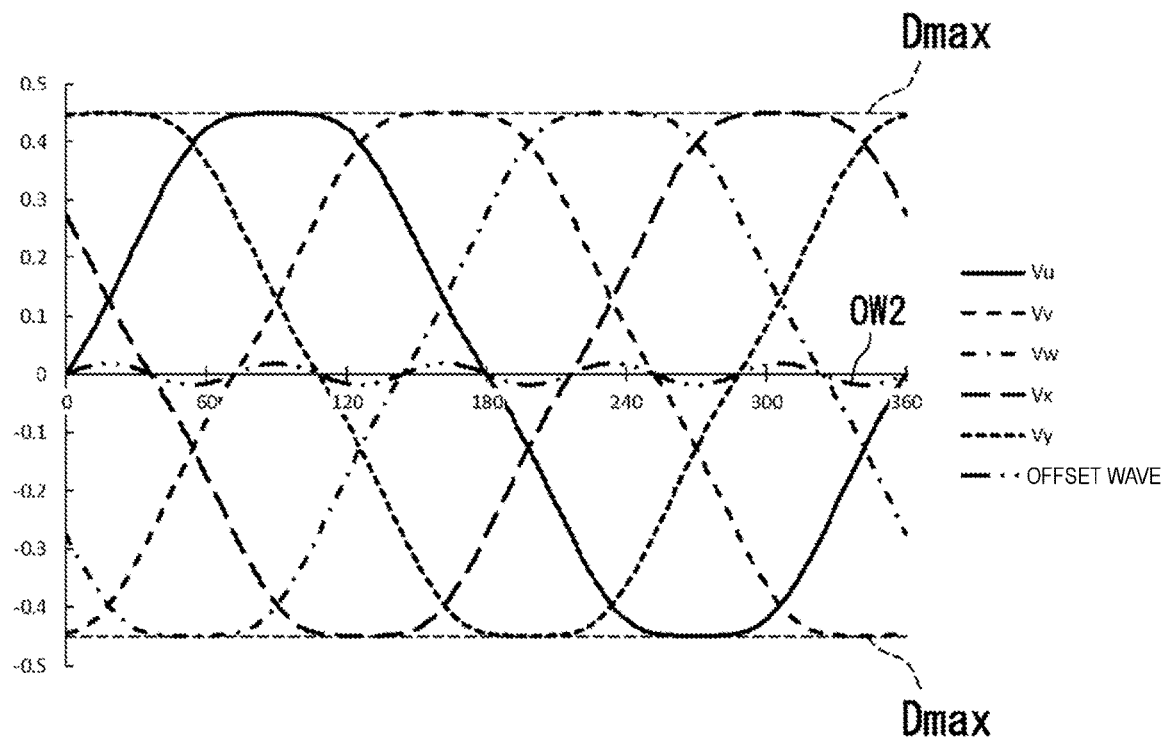
FIG. 12B is a view illustrating an output voltage after modulation.

Next, a modulation method of a sine wave will be described with reference to FIGS. 12A and 12B. FIG. 12A is a view illustrating the sinusoidal waveform Vub, the sinusoidal waveform Vvb, the sinusoidal waveform Vwb, the sinusoidal waveform Vxb, the sinusoidal waveform Vyb, and the offset wave OW2. FIG. 12B is a view illustrating the output voltage Vu, the output voltage Vv, the output voltage Vw, the output voltage Vx, the output voltage Vy, and the offset wave OW2 after modulation. In FIG. 12A the sinusoidal waveform Vub is indicated by a solid line, the sinusoidal waveform Vvb is indicated by a broken line, the sinusoidal waveform Vwb is indicated by a one-dot chain line, the sinusoidal waveform Vxb is indicated by a broken line having a large pitch, and the sinusoidal waveform Vyb is indicated by a broken line having a small pitch. In FIG. 12B, the output voltage Vu is indicated by a solid line, the output voltage Vv is indicated by a broken line, the output voltage Vw is indicated by a one-dot chain line, the output voltage Vx is indicated by a broken line having a large pitch, and the output voltage Vy is indicated by a broken line having a small pitch. The vertical axes in FIGS. 12A and 12B represent voltage values normalized by an input voltage V1-V2, and the output voltage of each phase has a value in a range of 0 to 1. This value also represents a duty value, which is a ratio of ON time of the first semiconductor switching element of each phase to a PWM cycle. When the second semiconductor switching element is switched, a value obtained by subtracting the value of the vertical axis from 1 becomes the ratio of ON time of the second semiconductor switching element to the PWM cycle. When both the first semiconductor switching element and the second semiconductor switching element are switched, switching is performed complementarily after providing an appropriate dead time in order to prevent both from being turned on simultaneously. The horizontal axes in FIGS. 12A and 12B represent electrical rotation angles of the motor, and the unit is degree.

As illustrated in FIG. 12A, the number of phases of the AC output is 5. That is, the motor drive circuit 100 controls drive of a 5-phase motor M.

As illustrated in FIG. 12A, the sinusoidal waveform Vub, the sinusoidal waveform Vvb, the sinusoidal waveform Vwb, the sinusoidal waveform Vxb, and the sinusoidal waveform Vyb are sinusoidal. The sinusoidal waveform Vvb is deviated in phase by 72 degrees ($2\pi/n$) with respect to the sinusoidal waveform Vub. The sinusoidal waveform Vwb is deviated in phase by 72 degrees ($2\pi/n$) with respect to the sinusoidal waveform Vvb. The sinusoidal waveform Vub is deviated in phase by 72 degrees ($2\pi/n$) with respect to the sinusoidal waveform Vyb. The sinusoidal waveform Vxb is deviated in phase by 72 degrees ($2\pi/n$) with respect to the sinusoidal waveform Vwb. The sinusoidal waveform Vyb is deviated in phase by 72 degrees ($2\pi/n$) with respect to the sinusoidal waveform Vxb.

The maximum waveform and the minimum waveform match in inclination at the position of the chain line indicated in FIG. 12A. For example, at an electrical angle of 36 degrees ($\pi/n$), the inclination of the maximum waveform (Y phase) matches the inclination of the minimum waveform (W phase). Therefore, the cut out waveforms can be smoothly connected.

The offset wave OW2 matches the product of the maximum waveform and the minimum waveform of the sinusoidal waveform (the sinusoidal waveform Vub, the sinusoidal waveform Vvb, the sinusoidal waveform Vwb, the sinusoidal waveform Vxb, and the sinusoidal waveform Vyb) moved and connected in the amplitude value direction and multiplied by the coefficient.

When the potential at the center of the output voltage is a reference, in a case where the maximum voltage is Dmax, the minimum voltage is −Dmax, and the amplitude of the sinusoidal waveform is A, the movement amount in the amplitude value direction corresponds to the maximum waveform of $-A\sin\{(n-1)\pi/(2n)\}$ and the minimum waveform of $A\sin\{(n-1)\pi/(2n)\}$. Therefore, it becomes easy to calculate the offset wave OW2.

When the offset wave OW2 is subtracted from the sinusoidal waveform of each phase (the sinusoidal waveform Vub, the sinusoidal waveform Vvb, the sinusoidal waveform Vwb, the sinusoidal waveform Vxb, and the sinusoidal waveform Vyb), a waveform after modulation contacting ±Dmax is obtained as illustrated in FIG. 12B. Therefore, the waveform after modulation becomes a smooth waveform falling within the range of ±Dmax.

Figure 13:
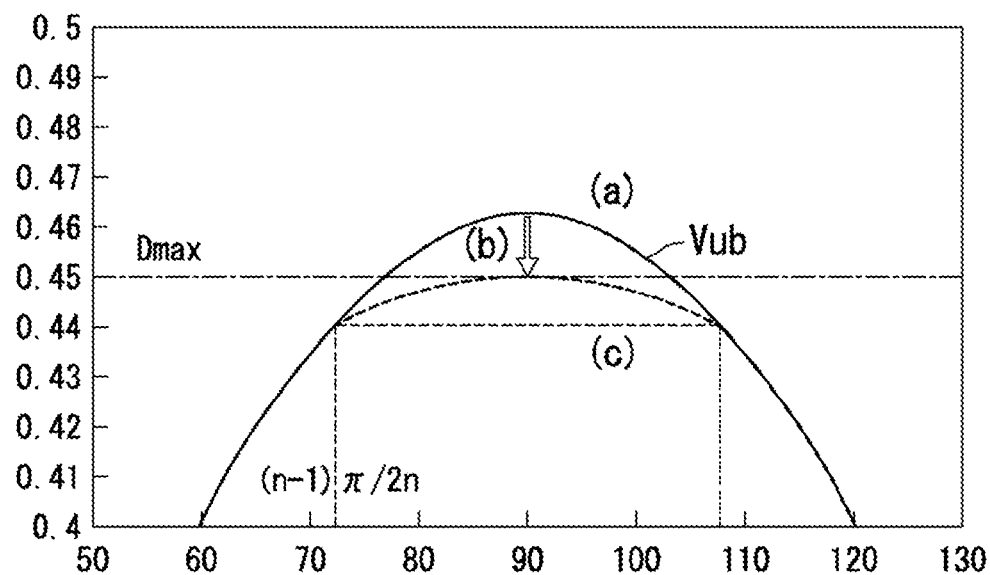
FIG. 13 is an enlarged view of a vicinity of an electrical angle of 90 degrees.

The coefficient K will now be described further with reference to FIGS. 12A and 13. FIG. 13 is an enlarged view of the vicinity of the electrical angle of 90 degrees.

As illustrated in FIG. 13, it is considered to obtain a waveform (c) having a peak value of Dmax by subtracting the offset wave (b) from the waveform (a) of the amplitude A. Based on the value $A\sin\{(n-1)\pi/n\}$ of (a) at an inclination match point $(n-1)\pi/n$, the height of the peak of (a) is $A-A\sin\{(n-1)\pi/2n\}$, and the peak height of the waveform (c) obtained by subtracting the offset wave (b) from this waveform is $D\max-A\sin\{(n-1)\pi/n\}$, and therefore the peak height of the offset wave (b) becomes A−Dmax. To generate the offset wave (b) from the waveform (a) waveform of the amplitude A, it is preferable to multiply a part exceeding $A\sin\{(n-1)\pi/n\}$ of the waveform (a) of the amplitude A by the coefficient $K=(A-D\max)/[A-A\sin\{(n-1)\pi/2n\}]$. That is, when the original sinusoidal waveform is slid by $A\sin\{(n-1)\pi/2n\}$ and multiplied by the coefficient K after connection, the offset wave OW2 illustrated in FIG. 12A is obtained. The amplitude A is assumed to be K=0 when A≤Dmax.

As described above with reference to FIGS. 12A and 13, the waveform of the offset wave OW2 matches the product of the maximum waveform and the minimum waveform of the sinusoidal waveform moved and connected in the amplitude value direction and multiplied by the coefficient. When the potential at the center of the output voltage is a reference, in a case where the maximum voltage is Dmax, the minimum voltage is −Dmax, and the amplitude of the sinusoidal waveform is A, the movement amount in the amplitude value direction corresponds to the maximum waveform of $-A\sin\{(n-1)\pi/(2n)\}$ and the minimum waveform of $A\sin\{(n-1)\pi/(2n)\}$. Therefore, it becomes easy to calculate the offset wave OW2.

The coefficient K is $(A-D\max)/[A-A\sin\{(n-1)\pi/(2n)\}]$. Therefore, it becomes easy to calculate the offset wave OW2.

Figure 14A:
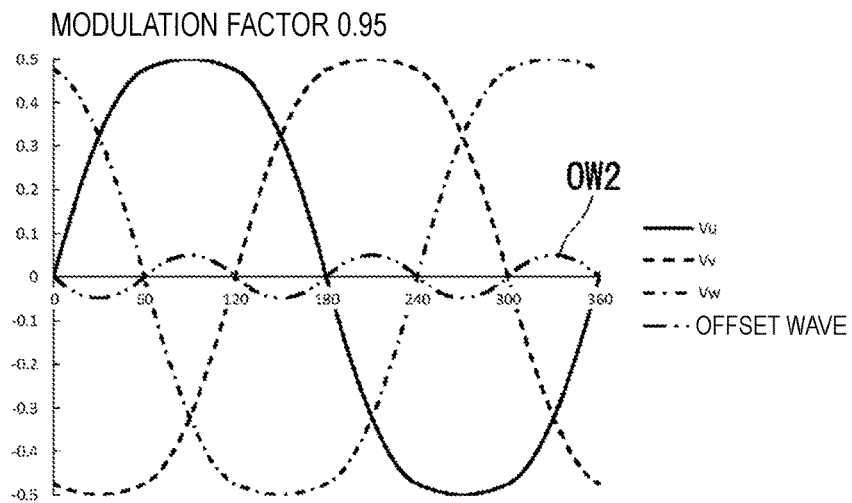
FIG. 14A is a view illustrating an output voltage and an offset wave after modulation.
Figure 14B:
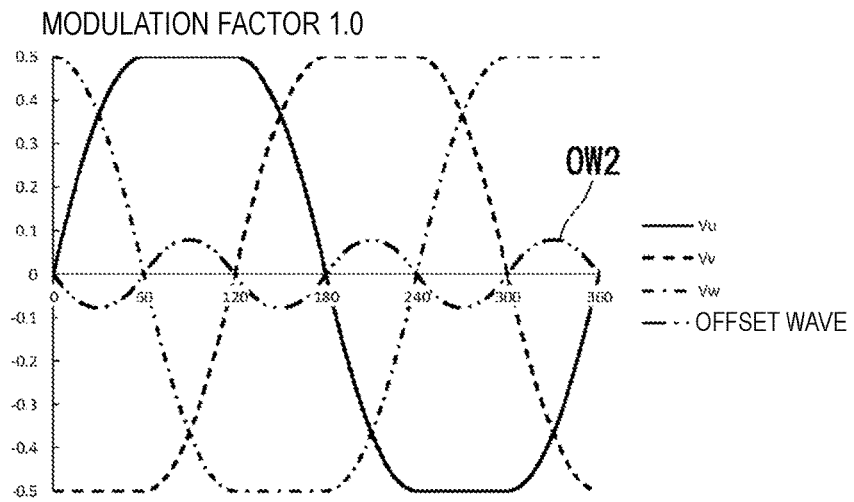
FIG. 14B is a view illustrating an output voltage and an offset wave after modulation.
Figure 14C:
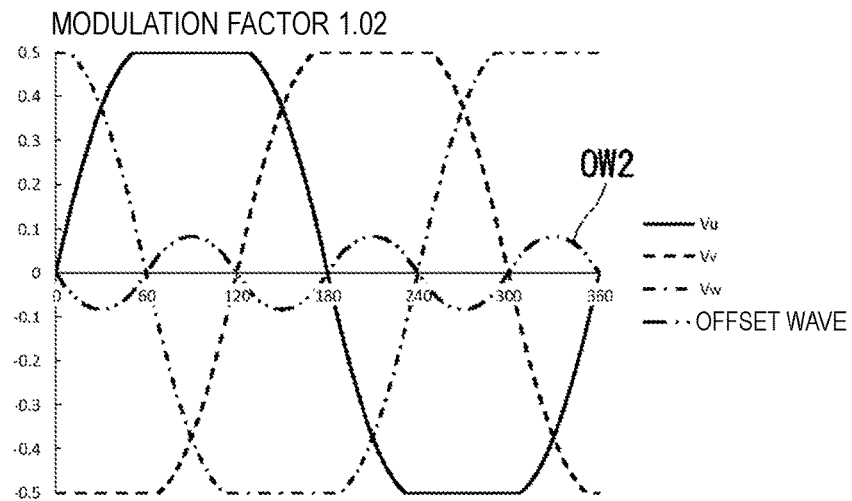
FIG. 14C is a view illustrating an output voltage and an offset wave after modulation

The output voltage when the modulation factor is changed will be described with reference to FIGS. 14A to 14C. FIGS. 14A to 14C are views illustrating the output voltage Vu, the output voltage Vv, the output voltage Vw, and the offset wave OW2 after modulation. FIG. 14A illustrates an output voltage at the modulation factor of 0.95. FIG. 14B illustrates the output voltage at the modulation factor of 1.0. FIG. 14C illustrates the output voltage at the modulation factor of 1.02.

As illustrated in FIG. 14C, when the modulation factor exceeds the second modulation factor (e.g., the modulation factor 1), the coefficient K is 1. Therefore, it becomes easy to calculate the offset wave OW2. When the modulation factor exceeds the second modulation factor, the waveform of the output voltage (the output voltage Vu, the output voltage Vv, and the output voltage Vw) can be obtained by subtracting the offset wave OW2 from the sinusoidal waveform of each phase (the sinusoidal waveform Vub, the sinusoidal waveform Vvb, the sinusoidal waveform Vwb, the sinusoidal waveform Vxb, and the sinusoidal waveform Vyb) and then fixing a part falling below −Dmax to −Dmax and fixing a part exceeding Dmax to Dmax.

When the modulation factor exceeds the second modulation factor (e.g., the modulation factor 1), at least one of the time in which the output voltage is fixed to the maximum voltage and the time in which the output voltage is fixed to the minimum voltage increases in accordance with the increase in the modulation factor. Therefore, it is possible to continuously perform transition from a non-overmodulation state (e.g., the modulation factor is 1 or less) to an overmodulation state (e.g., the modulation factor exceeds 1) without changing the shape of the waveform. As a result, it is possible to suppress a problem such as a speed step from occurring at the transition from the non-overmodulation state (e.g., the modulation factor is 1 or less) to the overmodulation state (e.g., the modulation factor exceeds 1).

INDUSTRIAL APPLICABILITY

The present invention can be suitably used for a power conversion device and a motor module. Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device that converts DC power into n-phase AC power comprising:
a signal generation unit configured to generate and output a pulse-width modulation (PWM) signal based on a common offset wave and a sinusoidal waveform, and
an inverter unit comprising:
a first power supply terminal configured to receive a first voltage,
a second power supply terminal configured to receive a second voltage,
an N series bodies circuit configured to receive the PWM signal, the first voltage, and the second voltage to generate an n-phase output voltage, and
an output terminal configured to output the n-phrase output voltage, wherein
the second voltage is lower than the first voltage, and the n-phase output voltage is output from the output terminal based on a modulation factor,
n is a number of phases of AC output and is an odd number of 3 or more,
the output voltage becomes a sinusoidal output at a low modulation factor equal to or less than a first modulation factor, and
at a second modulation factor larger than the first modulation factor, the output voltage is switched every electrical angle $\pi/n$ between a phase in which the output voltage is fixed to a maximum voltage and a phase in which the output voltage is fixed to a minimum voltage.

2. The power conversion device according to claim 1, wherein
with an increase in the modulation factor, there is a continuous change from a first state where the output voltage becomes the sinusoidal output to a second state where the phase in which the output voltage is fixed to the maximum voltage and the phase in which the output voltage is fixed to the minimum voltage are switched every electrical angle $\pi/n$.

3. The power conversion device according to claim 1, wherein
the maximum voltage substantially matches the first voltage.

4. The power conversion device according to claim 1, wherein
the minimum voltage substantially matches the second voltage.

5. The power conversion device according to claim 1, wherein
a waveform of the output voltage of each phase is a waveform obtained by subtracting the common offset wave from the sinusoidal waveform,
a waveform of the offset wave matches a product of a maximum waveform and a minimum waveform of the sinusoidal waveform moved and connected in an amplitude value direction and multiplied by a coefficient,
the maximum waveform indicates a maximum waveform of the sinusoidal waveforms of all phases, and
the minimum waveform indicates a minimum waveform of the sinusoidal waveforms of all phases.

6. The power conversion device according to claim 5, wherein
when a potential at a center of the output voltage is a reference, in a case where the maximum voltage is Dmax, the minimum voltage is −Dmax, and amplitude of the sinusoidal waveform is A, a movement amount in the amplitude value direction corresponds to the maximum waveform of $-A\sin\{(n-1)\pi/(2n)\}$ and the minimum waveform of $A\sin\{(n-1)\pi/(2n)\}$.

7. The power conversion device according to claim 5, wherein
the coefficient is $(A-Dmax)/[A-A\sin\{(n-1)\pi/(2n)\}]$.

8. The power conversion device according to claim 5, wherein
when the modulation factor exceeds the second modulation factor, the coefficient is 1.

9. The power conversion device according to claim 1, wherein
when the modulation factor exceeds the second modulation factor, at least one of a time in which the output voltage is fixed to the maximum voltage and a time in which the output voltage is fixed to the minimum voltage increases in accordance with an increase in the modulation factor.

10. A motor module comprising;
the power conversion device according to claim 1; and
the motor to which the n-phrase output voltage of the power conversion device is input.

11. A power conversion device that converts DC power into n-phase AC power comprising:
a signal generation unit configured to generate and output a pulse-width modulation (PWM) signal based on a common offset wave and a sinusoidal waveform, and
an inverter unit comprising:
a first power supply terminal configured to receive a first voltage,
a second power supply terminal configured to receive a second voltage,
an N series bodies circuit configured to receive the PWM signal, the first voltage, and the second voltage to generate an n-phase output voltage, and
an output terminal configured to output the n-phrase output voltage, wherein
the n-phase output voltage is output from the output terminal based on a modulation factor,
n is a number of phases of AC output and is an odd number of 3 or more,
a waveform of the output voltage of each phase is a waveform obtained by subtracting the common offset wave from the sinusoidal waveform,
a waveform of the offset wave matches a product of a maximum waveform and a minimum waveform of the sinusoidal waveform moved and connected in an amplitude value direction and multiplied by a coefficient, the maximum waveform indicates a maximum waveform of the sinusoidal waveforms of all phases, and the minimum waveform indicates a minimum waveform of the sinusoidal waveforms of all phases.

12. The power conversion device according to claim 11, wherein when a potential at a center of the output voltage is a reference, in a case where a maximum voltage is Dmax, a minimum voltage is −Dmax, and amplitude of the sinusoidal waveform is A, a movement amount in the amplitude value direction corresponds to the maximum waveform of $-A\sin\{(n-1)\pi/(2n)\}$ and the minimum waveform of $A\sin\{(n-1)\pi/(2n)\}$.

13. The power conversion device according to claim 11, wherein the coefficient is $(A-Dmax)/[A-A\sin\{(n-1)\pi/(2n)\}]$.

* * * * *